US009273682B2

(12) United States Patent
Stang (10) Patent No.: US 9,273,682 B2
(45) Date of Patent: Mar. 1, 2016

(54) METHOD FOR MAKING A PUMP SYSTEM WITH ENHANCED DYNAMIC SEAL RELIABILITY (71) Applicant: OMAX Corporation, Kent, WA (US)

(72) Inventor: Darren L. Stang, Covington, WA (US)

(73) Assignee: OMAX Corporation, Kent, WA (US)

( * ) Notice: Subject to any disclaimer, the term of this patent is extended or adjusted under 35 U.S.C. 154(b) by 403 days.

(21) Appl. No.: 13/725,640

(22) Filed: Dec. 21, 2012

(65) Prior Publication Data

US 2013/0108491 A1 May 2, 2013

Related U.S. Application Data (62) Division of application No. 12/491,840, filed on Jun. 25, 2009, now abandoned.

(51) Int. Cl.
F04B 39/00 (2006.01)
F16J 10/04 (2006.01)
F04B 53/00 (2006.01)
F04B 53/02 (2006.01)
F04B 1/00 (2006.01)

(52) U.S. Cl.
CPC . *F04B 39/00* (2013.01); *F04B 1/00* (2013.01); *F04B 53/008* (2013.01); *F04B 53/02* (2013.01); *F16J 10/04* (2013.01); *F05C 2225/00* (2013.01); *Y10T 29/49236* (2015.01)

(58) Field of Classification Search
CPC ............. F04B 39/00; F04B 1/00; F04B 53/02; F04B 53/008; F05C 2225/00; F16D 2125/08; F16J 10/04; F16J 1/01; F16J 15/56; Y10T 29/49236
See application file for complete search history.

(56) References Cited

U.S. PATENT DOCUMENTS

| 4,764,394 | A | 8/1988 | Conrad |
| 5,198,285 | A | 3/1993 | Arai et al. |
| 5,771,873 | A | 6/1998 | Potter et al. |
| RE37,294 | E | 7/2001 | Knapp et al. |
| 6,264,439 | B1 | 7/2001 | Falk et al. |
| 6,454,548 | B2 | 9/2002 | Falk et al. |
| 6,548,173 | B2 | 4/2003 | Erdemir et al. |
| 6,632,324 | B2 * | 10/2003 | Chan ........................ 156/345.48 |
| 6,893,720 | B1 | 5/2005 | Nakahigashi et al. |
| 6,919,288 | B2 * | 7/2005 | Yamamoto et al. .......... 501/98.4 |

(Continued)

FOREIGN PATENT DOCUMENTS

JP          62-055112          3/1987

OTHER PUBLICATIONS

"Memory water jet milling", available from http://www.computescotland.com/memory-water-jet-milling-5236.php, Apr. 24, 2012, 4 pages.

*Primary Examiner* — Sarang Afzali
(74) *Attorney, Agent, or Firm* — Perkins Coie LLP (57) ABSTRACT A pressure pump may include a reciprocating assembly including a dynamic seal configured to be in sliding contact with a surface. The surface may be implanted with positive ions such as hydrogen ions/protons to provided reduced wear and/or greater service life of the dynamic seal. According to embodiments, a pump may include an ultra-high molecular weight polyethylene dynamic seal may substantially fixed relative to a cylinder wall, and a proton impregnated reciprocating plunger may pump high pressure water or a water based fluid in a system. The pump may exhibit increased dynamic seal life.

15 Claims, 7 Drawing Sheets

(56) References Cited

U.S. PATENT DOCUMENTS

| | | |
|---|---|---|
| 7,073,611 B2 | 7/2006 | Sui et al. |
| 7,134,851 B2 | 11/2006 | Chenoweth |
| 7,568,424 B2 * | 8/2009 | Hopkins et al. ............. 92/165 R |
| 8,664,084 B2 * | 3/2014 | Deguet et al. ................ 438/458 |
| 2001/0048883 A1 | 12/2001 | Falk et al. |
| 2005/0121312 A1 | 6/2005 | Sui et al. |
| 2008/0019851 A1 | 1/2008 | Hopkins et al. |
| 2009/0272245 A1 | 11/2009 | Voice et al. |
| 2009/0311944 A1 | 12/2009 | Olsen |
| 2010/0326271 A1 | 12/2010 | Stang |

\* cited by examiner

METHOD FOR MAKING A PUMP SYSTEM WITH ENHANCED DYNAMIC SEAL RELIABILITY

PRIORITY CLAIM

The present application is a divisional application of U.S. patent application Ser. No. 12/491,840, filed Jun. 25, 2009, entitled Reciprocating Pump and Method for Making a System with Enhanced Dynamic Seal Reliability, which application is incorporated herein by reference in its entirety.

BACKGROUND

In reciprocating pumps including high pressure reciprocating water pumps, a reciprocating plunger may (in some applications) typically last 60 million cycles between replacements due to wear. A dynamic seal may be configured to seal the circumference of a reciprocating plunger. A dynamic seal, in some applications, may typically have a shorter operational life than the plunger it contacts. For example, a dynamic seal may have an operational life of about 20 million cycles between replacements due to wear. Typically, a wear surface of a dynamic seal is made from ultra-high-molecular-weight polyethylene (UHMWPE).

SUMMARY

According to an embodiment, a reciprocating pump includes a block defining a compression volume having a cylinder wall; a compression member configured to reciprocate in the compression volume; and a dynamic seal including a high molecular weight aliphatic polymer in a substantially fixed position relative to the cylinder wall and substantially in sliding contact with the compression member to substantially seal a gap between the compression member and the cylinder wall to maintain pressure in the compression volume; wherein the compression member in sliding contact with the dynamic seal includes a positive ion-doped surface.

According to another embodiment, a method for making all or a part of a reciprocating system with enhanced dynamic seal reliability includes providing a part including a sliding surface configured to slide in substantial contact with a high molecular weight aliphatic polymer dynamic seal; and placing the part under vacuum and bombarding at least a portion of the sliding surface with hydrogen ions to produce a proton implanted sliding surface.

DETAILED DESCRIPTION

In the following detailed description, reference is made to the accompanying drawings, which form a part hereof. In the drawings, similar symbols typically identify similar components, unless context dictates otherwise. Other embodiments may be used and/or and other changes may be made without departing from the spirit or scope of the disclosure.

Figure 1:
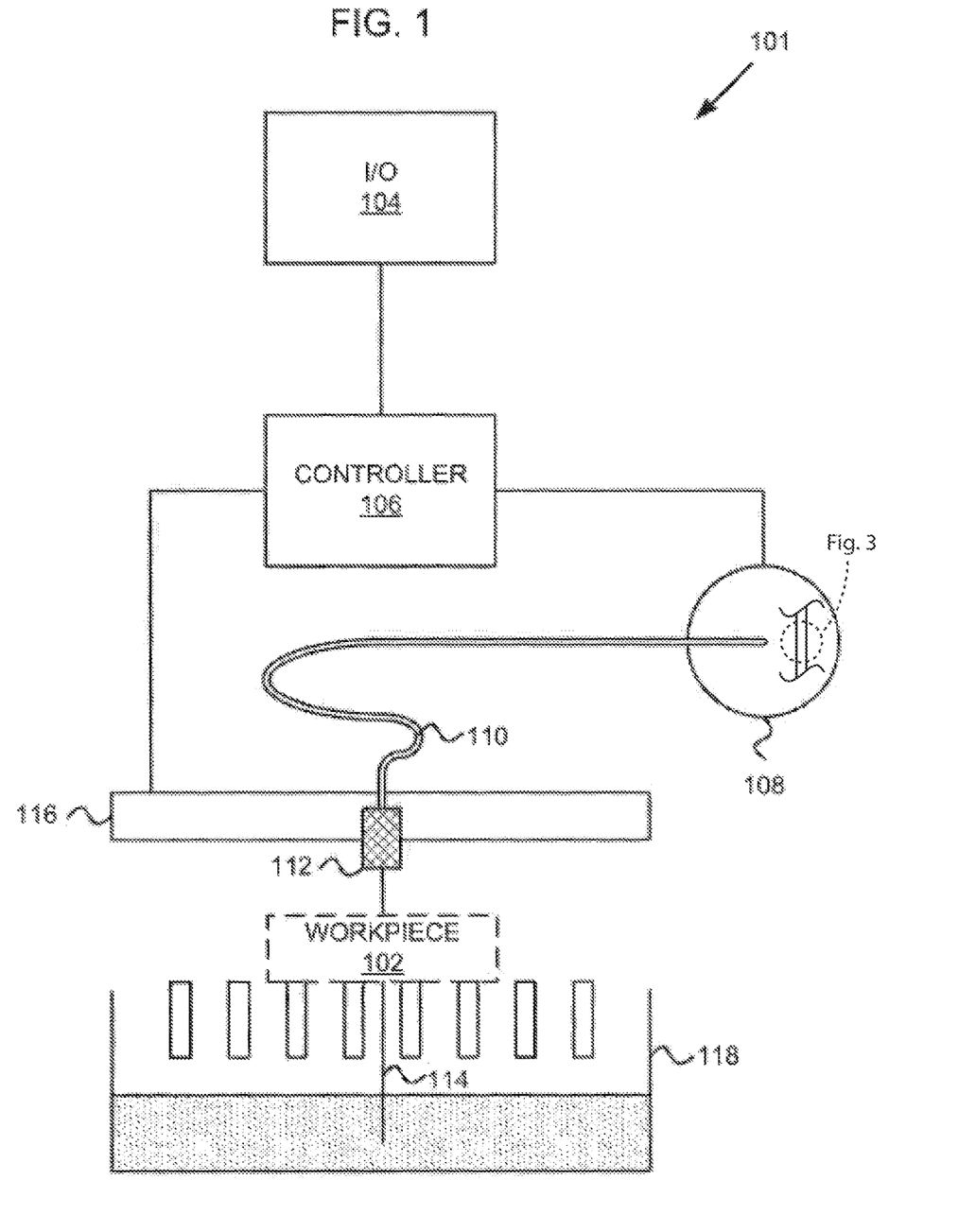
FIG. 1 is a diagram illustrating a fluid jet cutting or cleaning system according to an embodiment.

FIG. 1 is a diagram illustrating a fluid jet system 101 configured to cut or clean a workpiece 102, according to an embodiment. A computer interface 104 may be configured to receive computer instructions corresponding to a cutting path through the workpiece 102. A controller 106 may be configured to receive the computer instructions to drive the fluid jet system 101. Alternatively, a tool path may be produced by nozzle motion and/or workpiece motion driven by a different method, such as by hand guiding, for example.

The controller 106 may be operatively coupled to a high pressure pump 108. The pump 108 may optionally be controlled separately. The high pressure fluid pump 108 is configured to provide high pressure fluid through high pressure tubing 110 to a nozzle 112. The nozzle 112 receives the high pressure fluid and projects a high velocity fluid jet 114. The high velocity fluid jet 114 may include substantially pure water, a water based fluid, and alternatively may include entrained abrasive particles such as garnet from an abrasive supply system (not shown).

The controller 106 is operatively coupled to drive an actuation system 116 configured to drive the position of the nozzle 112. Typically actuation systems 116 include at least X-Y drive. Some actuation systems additionally include Z-axis and tilt drive. The controller 106 drives the actuation system 116 to position the nozzle 112 to scan the fluid jet 114 across the workpiece 102. The workpiece 102 may be supported by a workpiece support system 118. Optionally, the actuation system 116 may be configured to position the workpiece support system 118 relative to the nozzle 112.

The high pressure fluid pump 108 of the fluid jet system 101 may typically include a reciprocating pressure pump. According to other embodiments, a high pressure fluid pump 108 may be used in other pressurized fluid systems, and especially in high pressure water pumping applications such as impulse fire extinguishing systems, debarking systems, pressure washers, and high pressure water deburring and cleaning apparatuses, for example.

Figure 2:
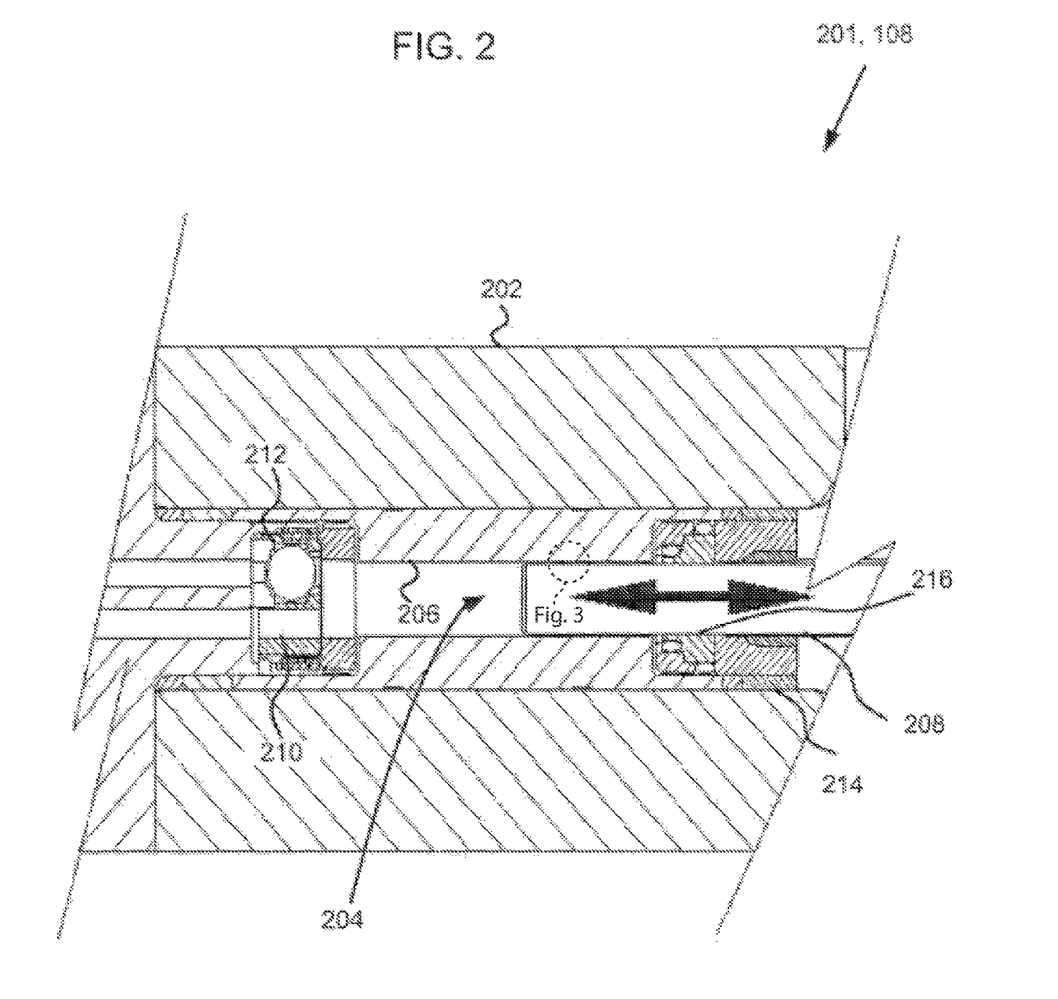
FIG. 2 is a diagram of a portion of a plunger pump, according to an embodiment.

FIG. 2 is a diagram of a portion of a high pressure fluid pump 108 embodied as a plunger pump, according to an embodiment. A cylinder block 202 (which may be lined, as shown) includes at least one compression volume 204 defined by a cylinder wall 206. A compression member 208 may be embodied as a plunger having substantially constant diameter. The plunger 208 is driven in reciprocation, typically by a crankshaft (not shown). The plunger 208 reciprocates in the compression volume 204 to alternately receive fluid through an inlet 212 including a check valve, and pump pressurized fluid out a port 210. For example, in the embodiment 101 of FIG. 1, water is pumped past the outlet 210, through a check valve (not shown) and through the pressure tubing 110 to the nozzle 112. The water may be delivered to the outlet 210 at one or more pressures above about 30,000 psi. Typically, water is supplied to the inlet 212 at an elevated pressure created by a first stage pump (not shown) of conventional design.

A guide assembly 214 may guide the plunger 208 and support a dynamic seal 216. The dynamic seal 216 is in sliding contact with the plunger 208 and, during its service life, maintains a sufficient seal against the plunger 208 to maintain the pressure in the compression volume 204. The dynamic seal 216 may be formed to include a high molecular weight aliphatic polymer, such as ultra-high molecular weight polyethylene (UHMWPE). The UHMWPE forms the sealing surface that is in sliding contact with the plunger 208. Typically, the dynamic seal 216 is formed substantially entirely from UHMWPE. Alternatively, the dynamic seal 216 may include a composite structure with the contacting surface formed from UHMWPE.

Some applications may prefer fluorinated seals such as polytetrafluoroethylene (PTFE), which has a lower coefficient of friction at pressures less than about 30,000 psi. However, coefficient of friction of PTFE begins to increase at elevated pressures greater than ~20,000 psi. UHMWPE has a higher coefficient of friction than PTFE at pressures below about 30,000 psi, but the coefficient of friction of UHMWPE decreases with increasing pressures. At approximately 30,000 psi and above, the coefficient of friction of PTFE is greater than that of UHMWPE. For reasons related to its superior tribological properties, UHMWPE is preferred for high pressure applications.

A plunger 208 may be made from a variety of materials that are hard and/or have a hard surface, and that have a surface that is capable of being polished. For example, a plunger 208 may be formed or coated from a hard material such as at least one of diamond, silicon nitride, silicon carbide, aluminum oxide (alumina), tungsten carbide, cubic boron carbide, boron carbide, titanium diboride, titanium carbide, zirconium carbide, tungsten carbide or a boride treated material.

Even though the plunger 208 includes a hard surface, the plunger 208 may still have a relatively limited service life. The surface of the plunger typically wears through a wear depth during its service life, thus substantially constantly exposing new surface. The service life of a plunger 208 in a fluid jet system 101 (FIG. 1) may typically be about 60 million cycles.

Heretofore, dynamic seals 216 have had service lives shorter than a typical plunger service life. For example, the current generation of dynamic seal formed from UHMWPE, as used prior to embodiments disclosed herein, may have a typical service life of about 20 million cycles. At the end of their respective service lives, the plunger 208 and the dynamic seal 216 must be replaced. The difference in service lives achieved heretofore has thus required equipment 101 shut-down and rebuilding at intervals that are only one-third the interval of the plunger 208 service life, owing to the shortened service life of the dynamic seal.

According to an embodiment, the surface of the plunger 208 may be implanted with positive ions. According to an embodiment, the surface of the plunger may be implanted with hydrogen ions (protons). Implanting the surface of a plunger 208 with protons was found to result in increased service life of the UHMWPE dynamic seal.

Figure 3:
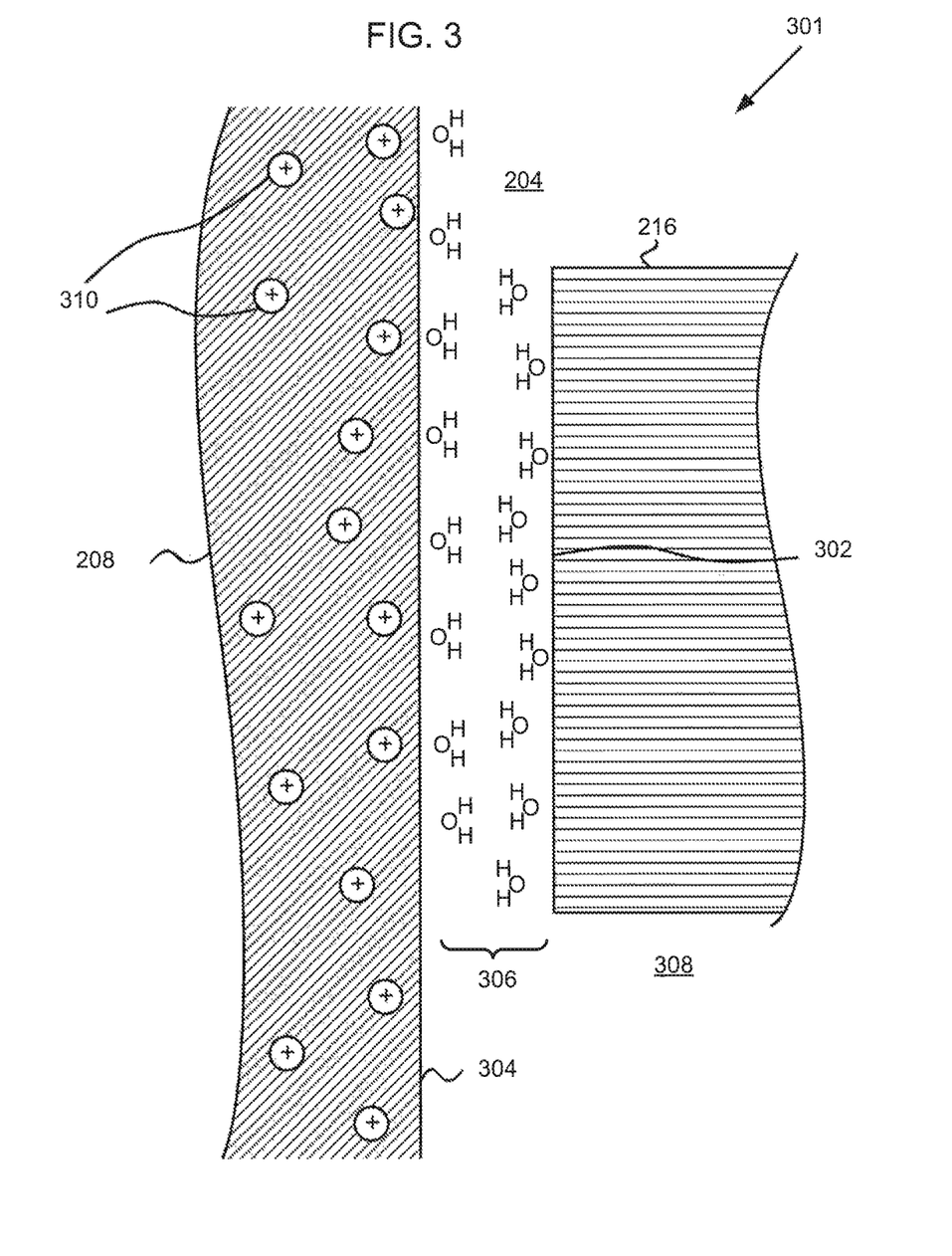
FIG. 3 is a diagram of a possible mechanism for increased dynamic seal life, according to an embodiment.

FIG. 3 is a diagram (not to scale) of a possible mechanism for increased dynamic seal 216 life, according to an embodiment. A dynamic seal 216 may be formed from an aliphatic polymer. The aliphatic polymer may be characterized by hydrogen atoms bound to a carbon chain. The single hydrogen electron in a bound hydrogen atom is contributed to an S-bond between the hydrogen atom and a carbon atom, and the electron may be somewhat withdrawn from the hydrogen atom (nucleus). The electronic environment near the periphery of an aliphatic polymer may tend to be dominated by bound hydrogen atoms. Since the electrons from the bound hydrogen atoms near the periphery of the aliphatic polymer are somewhat withdrawn, the periphery of an aliphatic polymer may tend to be somewhat electro-positive. Accordingly, the surface 302 of a dynamic seal 216 formed from an aliphatic polymer may tend to be somewhat electro-positive.

The sliding surface 304 of compression member such as a plunger 208 closely contacts the surface 302 of the dynamic seal 216. However, at least portions of the interface between the surfaces 302, 304 may be characterized by a gap 306 of molecular dimensions. The gap 306 extends from the compression volume 204 to a low pressure region 308 on the opposite side of the dynamic seal 216. For example, the low pressure region 308 may include normal atmosphere. The small dimension of the gap 306 coupled with molecular interaction forces in the gap 306 substantially maintain the pressure difference between the compression volume 204 and the low pressure region 308. According to embodiments, the plunger 208 whose surface 304 is in sliding contact with the surface 302 of the dynamic seal 216 includes implanted positive ions 310. According to an embodiment, the implanted positive ions are hydrogen nuclei or protons. The implanted positive ions 310 may tend to make the surface 304 of the plunger 208 somewhat electro-positive.

A polar pumped fluid such as water, indicated by $_H O_H$ molecules near the surfaces 302, 304 and in the gap 306, may tend to undergo hydrogen bonding with the respective surfaces 302, 304 as shown. Hydrogen bonding tends to orient the electro-negative oxygen atom toward an electro-positive moiety, such as the hydrogen atom of another water molecule. Water or another polar fluid may tend to orient with electro-negative oxygen atoms toward the electro-positive surface 302 of the high molecular weight aliphatic polymer dynamic seal 216. Similarly, water or another polar fluid may tend to orient with electro-negative oxygen atoms toward the electro-positive surface 304 of the plunger 208. The hydrogen bonding of water or another polar fluid toward the surfaces 302, 304 may tend to result in relatively electro-positive dipoles facing one another in the gap 306. The dipole-dipole interactions between polar fluid molecules may tend to push the fluid molecules away from one another, thus increasing lubricity between the sliding surfaces 302, 304. Similarly, if there is insufficient gap 306 to allow fluid dipole-dipole interactions, or if a non-polar fluid is pumped, there may remain an electronic-electronic interaction of similar sign between the surfaces 302, 304 themselves, thus reducing adhesion and increasing effective lubricity between the surfaces 302, 304.

Figure 4:
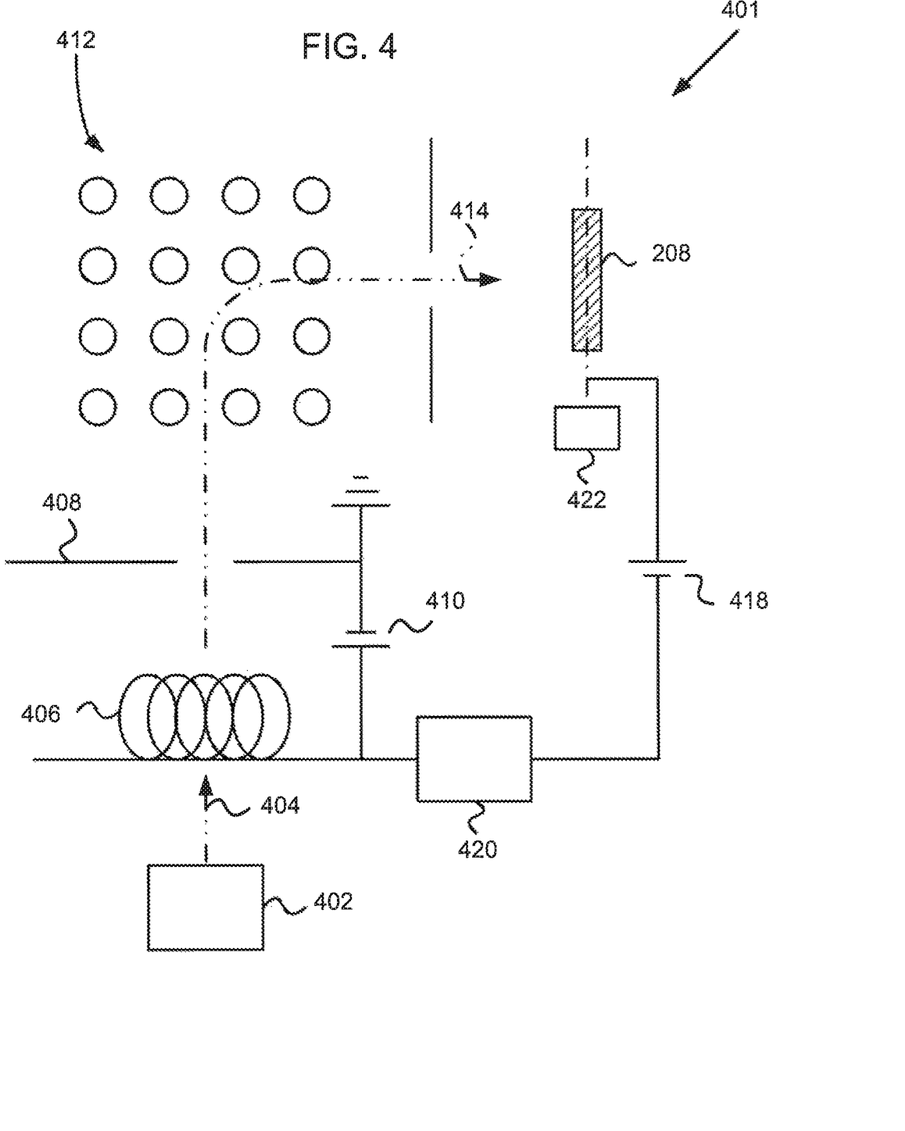
FIG. 4 is a diagram of an ion implantation apparatus, according to an embodiment.

FIG. 4 is a diagram of an ion implantation apparatus 401 for implanting positive ions into the surface of a compression member 208 to be configured for sliding contact with a dynamic seal 216, according to an embodiment. The ion implantation apparatus 401 includes an ion source 402 that emits ions 404 in a vacuum. Responsive to a potential difference between a grid 406 and an anode 408 driven by a DC acceleration power supply 410, the ions stream toward a separation and steering magnet 412. The separation magnet 412 steers ions differentially according to their charge to mass ratio to form an ion beam 414 of a selected ion.

The ion beam 414 is launched toward a target 208 held at a lower potential by a second DC power supply 418 configured as a deceleration power supply. A current integrator 420 provides electrical current to drive the acceleration and deceleration power supplies, and determines the energy of the ion beam 414. The energy of the ions in the beam 414 determines implantation depth into the surface of the target 208. Typically, the dosage of the ion beam 414 may be expressed as the number of ions per unit area that are impacted on the target 208.

According to an embodiment, the target 208 may include at least a portion of a plunger 208 (FIG. 2). To provide substantially equal ion implantation around substantially the entirety of the cylindrical surfaces of the plunger 208, the target 208 may be rotated by a motor 422 during exposure to the ion beam 414. Alternatively, the target 208 may be implanted, rotated, and then implanted again. Because of the power and time required to pump down the implantation chamber to the desired vacuum, it may be preferable to provide rotation of the target 208 using the motor 422. Similarly, the target 208 may include plural targets, for example mounted in a cassette, that are moved past the ion beam 414 for implantation.

Figure 5:
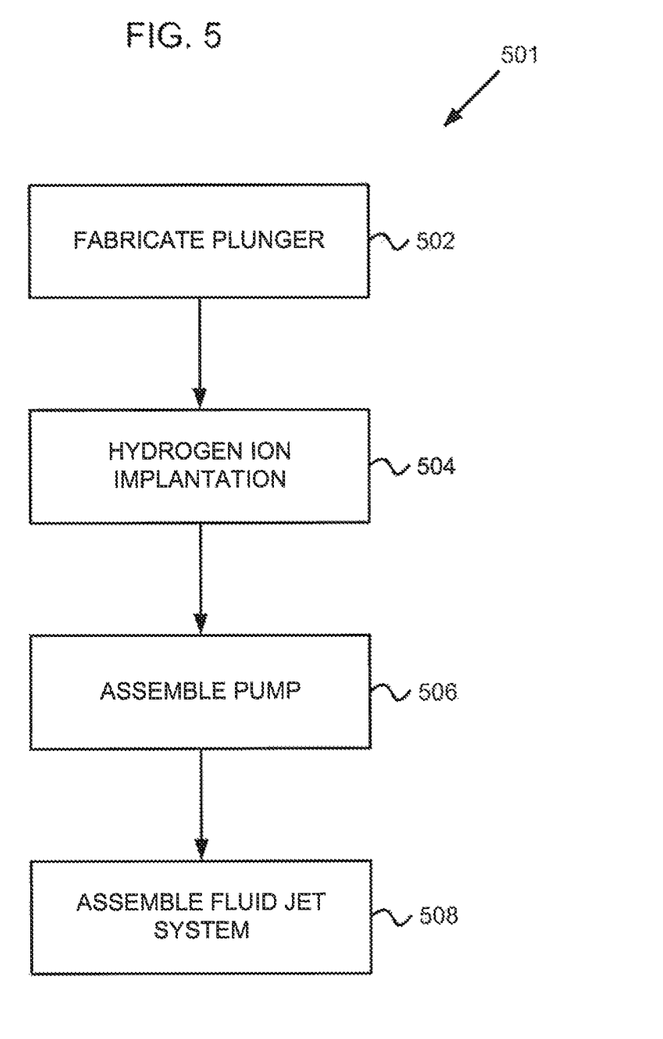
FIG. 5 is a flow chart showing a method for making a positive ion implanted plunger, according to an embodiment.

FIG. 5 is a flow chart showing a method 501 for making a pump 108, 201 (FIG. 2) (and optionally a system 101 (FIG. 1)) including a hydrogen ion implanted plunger 208, according to an embodiment.

In step 502, the plunger is at least partially fabricated. For many hard materials, such fabrication may include mixing the hard material with binders, pressure forming a blank from the mixture such as in an isostatic press, machining the blank, firing the blank to sinter the material, optionally machining the fired part blank, and polishing at least a portion of the surface of the fired part.

Optionally, step 502 may include forming a plunger structure, and then coating the plunger structure with a material selected to increase the surface hardness. For example, step 502 may include one or more of diamond coating, boride coating, carbide coating, doping to induce stress, plating, vacuum deposition, and/or vapor deposition.

Proceeding to step 504, the plunger 208 is implanted with hydrogen ions, for example using an apparatus 401 depicted in the diagram of FIG. 4. As described above, implantation depth may be determined by the energy of the ion beam. The density of implanted ions is determined by the ion dosage. According to an embodiment, dosage may be determined by exposure time to the ion beam. According to another embodiment, dosage may be determined by the density of the ion beam. Embodiments related to particular ion implantation conditions and resultant distributions are described below in conjunction with FIGS. 6 and 7.

Optionally, a coating process in step 502 and an ion implantation in step 504 may be applied in a combined process. For example, a vacuum pump-down may be applied, a vacuum-deposited hard coating applied, and hydrogen ion implantation performed while or after the vacuum-deposited hard coating is applied. For embodiments where the ion implantation 504 is provided simultaneously or iteratively with application of a hard coating, ion acceleration voltages depths may be adjusted to provide desired finished ion depth distributions. Since less than the entire hard coating thickness may be present during early portions of hard coating, a relatively low ion acceleration voltage may be applied because such early applied ions will be buried by ongoing or subsequent hard coating.

Proceeding to step 506, the pump 108, 201 is assembled. Assembly 506 may include initial assembly of a new pump 108, 201. Alternatively, assembly 506 may include rebuilding a used pump 108, 201, for example to replace a plunger that has reached the end of its service life. Assembly may typically include assembly of the hydrogen ion implanted plunger 208 and a UHMWPE dynamic seal 216 (FIG. 2) into a pump 108, 201.

As described above, the service life of a plunger 208 in a pump 201, 108 used in a high pressure system such as a fluid jet system 101 (FIG. 1) may typically be about 60 million cycles. Without proton implantation, the typical service life for a dynamic seal 216 may be in the range of 20 to 30 million cycles. In other words, the seal 216 may not reliably last half the service life of the plunger 208. Therefore, the user may need to perform two seal 216 replacements between plunger 208 replacements, or choose to replace the plunger 208 before it reaches the end of its service life.

According to an embodiment, the proton implantation step 504 may result in extended dynamic seal 216 service life that reliably meets or exceeds half the service life of the plunger 208 (e.g. the dynamic seal 216 may have a reliable service life of 30 million cycles or more), thus reducing downtime and rebuilding costs by one-third or more. According to an embodiment, the proton implantation step 504 may result in extended dynamic seal 216 service life that reliably meets or exceeds the entire service life of the plunger 208 (e.g. the dynamic seal 216 may have a reliable service life of 60 million cycles or more), thus reducing downtime and rebuilding costs by two-thirds. Testing has shown the wear of a UHMWPE dynamic seal 216 in use with a proton-implanted plunger 208 to have half or less the wear of a UHMWPE dynamic seal 216 used with a non-proton-implanted plunger 208, thus indicating at least double the dynamic seal service life compared to a typical prior art dynamic seal.

Referring again to FIG. 5, the process 501 proceeds to optional step 508, wherein a fluid jet system 101, shown in FIG. 1, may be assembled to include a pump 108, 201 including one or more hydrogen ion implanted plungers 208 and corresponding UHMWPE dynamic seals 216.

Figure 6:
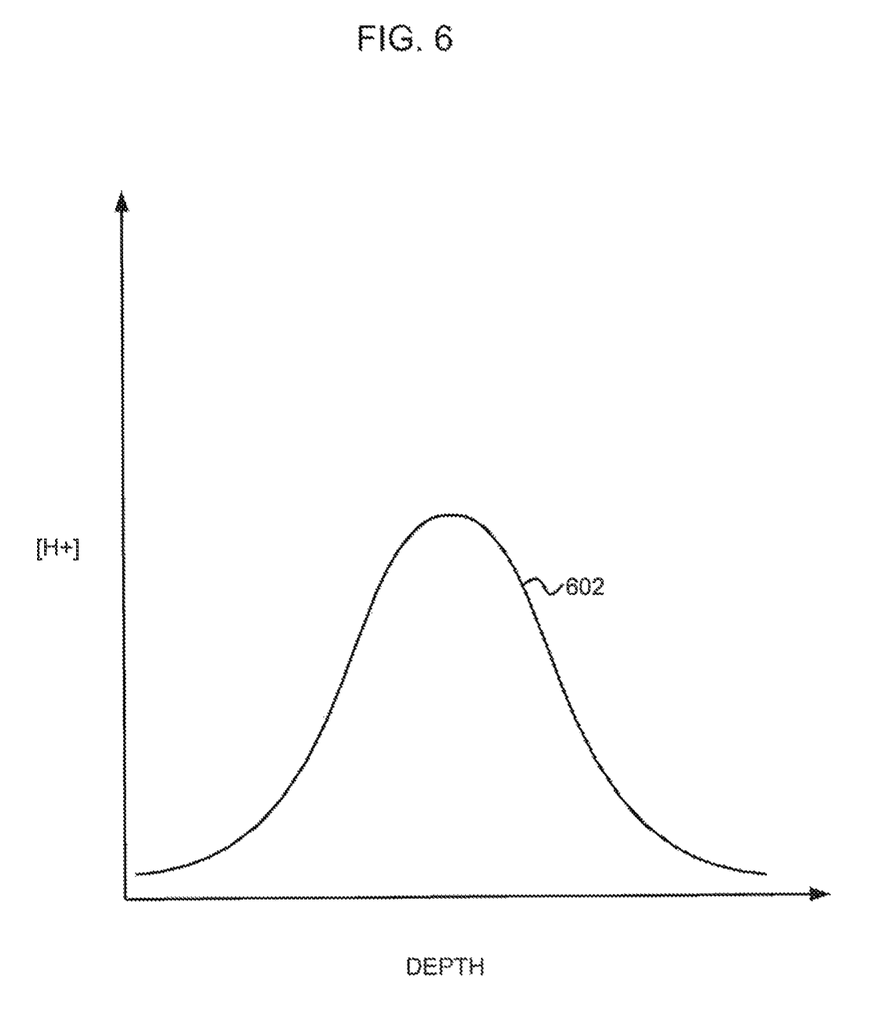
FIG. 6 is a graph showing ion concentration vs. depth, according to an embodiment.

FIG. 6 is a graph showing an ion concentration [H+] vs. depth distribution 602, according to an embodiment. Protons (hydrogen ions) are implanted into the plunger 208 by bombarding the surface of the plunger 208 with a hydrogen ion stream in a vacuum chamber. The dosage of the ion stream may be expressed as atoms per square centimeter. The amount of treatment time and/or the ion stream density may determine the dosage. The dosage determines the maximum concentration, shown as the maximum height of the Gaussian peak as hydrogen ion concentration, [H+]. Typically, concentration of implanted ions may be expressed as atomic percentage.

The depth of ion penetration is a function of ion energy, with the nominal depth being expressed as the distance from the surface of the plunger 208. Ion energy may typically be expressed in electron volts or kilo-electron volts (KeV). Depth of penetration may typically be expressed in Angstroms from the surface to the maximum value of the Gaussian ion distribution curve 602.

According to one experiment an alumina plunger was exposed to a 100 KeV proton beam at a dosage of $1 \times 10^{15}$ ions per square centimeter under vacuum. The resultant ion distribution 602 was found to have a maximum proton concentration of 0.074 atomic percent (atomic %) at 5837 Angstroms depth. A pump 108, 201 run with the implanted plunger was found to exhibit a UHMWPE dynamic seal wear rate reduced by about 40% compared to a non-implanted plunger.

According to another experiment, an alumina plunger was exposed to a 38 KeV proton beam at a dosage of $5 \times 10^{15}$ ions per square centimeter. The resultant ion distribution 602 was 0.091 atomic % maximum at 1530 Angstroms depth. Testing up to 10 million cycles the 38 KeV treated plunger showed significantly decreased wear of the dynamic seal.

Figure 7:
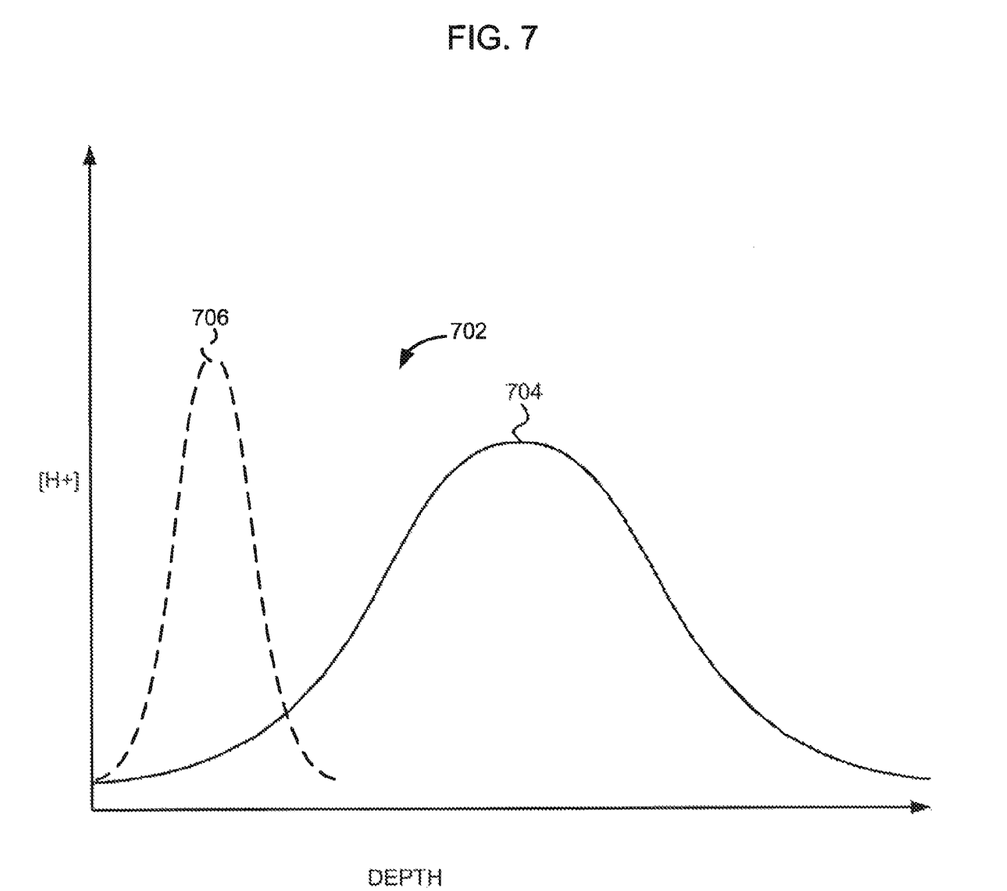
FIG. 7 is a graph showing ion concentration vs. depth in a multi-modal implanted plunger, according to an embodiment.

FIG. 7 is a graph showing ion concentrations vs. depth 704, 706 for individual peaks in a multi-modal distribution 702 in an implanted plunger 208, according to an embodiment. The measureable ion concentration would be represented as the sum of the distributions 704, 706. However, for ease of understanding, the individual concentration distributions 704, 706 are shown on the same graph 702.

As described above, the plunger 208 typically wears through a wear depth during its service life. Depth of proton implantation is important because of the way the plunger 208 wears over time. During initial use, the original surface of the plunger 208 is in contact with the dynamic seal 216. As the number of operating cycles builds, the plunger 208 wears, exposing deeper and deeper layers of material. For the embedded protons to increase dynamic seal 216 life over the life of the plunger 208, it may be advantageous to have protons at the original surface and to maintain concentration through the wear depth of the plunger 208.

Multi-modal proton implanting, shown in the curves 704, 706 in the graph 702 of FIG. 7 may be one way to distribute protons substantially throughout the wear depth of the plunger 208. For example a proton distribution 704 in an alumina plunger 208 may be characterized as 0.074 atomic percent (atomic %) at 5837 Angstroms depth, and may be produced by exposing the plunger 208 to a 100 KeV proton beam at a dosage of $1\times10^{15}$ ions per square centimeter under vacuum. The proton distribution 704 may be especially useful for reducing dynamic seal 216 wear (thus increasing the service life of the dynamic seal 216) during the latter portions of the plunger 208 service life.

A proton distribution 706 in an alumina plunger 208 may be characterized as 0.091 atomic % maximum at 1530 Angstroms depth. The proton distribution 706 may be produced by exposing the plunger 208 to a 38 KeV proton beam at a dosage of $5\times10^{15}$ ions per square centimeter under vacuum. The proton distribution 706 may be especially useful for reducing dynamic seal 216 wear (thus increasing the service life of the dynamic seal 216) during the early portions of the plunger 208 service life.

Thus, a plunger 208 may be treated with a plurality of proton beam energies. The plurality of proton beam energies may extend the effect of increased dynamic seal 216 service life for substantially the duration of the plunger 208 service life. The plurality of proton beam energies may be two energies, as exemplified by the bimodal distributions 704, 706 of the graph 702. Alternatively, a trimodal or more proton ion distribution may be produced by treating the part with three or more proton beam energies. The dosage may be varied for each treatment to select different individual distribution heights. Alternatively, proton beam energy may be ramped during treatment to produce a broader distribution of protons. A broadened proton depth distribution corresponding to ramping proton beam energy, as well as broadened proton depth distribution corresponding to plural constant proton beam energies may be referred to commonly herein as a multimodal distribution of protons.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A method for assembling and operating a pump, the method comprising:
   providing a plunger that includes an ion-doped material having an electropositive outer surface;
   providing a seal that includes a polymeric material having an electropositive inner surface;
   operably positioning the plunger within the seal such that the electropositive outer surface of the ion-doped material slidably contacts the electropositive inner surface of the polymeric material, wherein operably positioning the plunger within the seal includes operably assembling at least a portion of a compression assembly of the pump;
   moving the plunger relative to the seal to pressurize a polar liquid to a pressure greater than 30,000 psi;
   hydrogen bonding molecules of the polar liquid to the electropositive outer surface of the ion-doped material while moving the plunger; and
   hydrogen bonding molecules of the polar liquid to the electropositive inner surface of the polymeric material while moving the plunger,
   wherein molecules of the polar liquid hydrogen bonded to the electropositive outer surface of the ion-doped material of the plunger interact with molecules of the polar liquid hydrogen bonded to the electropositive inner surface of the polymeric material to reduce friction between the plunger and the seal and thereby increase a service life of the seal.

2. The method of claim 1 wherein providing the plunger includes providing the plunger having the ion-doped material as a hydrogen-ion-doped material.

3. The method of claim 1 wherein providing the plunger includes providing the plunger having the ion-doped material as an ion-doped ceramic material.

4. The method of claim 1 wherein providing the plunger includes providing the plunger having the ion-doped material as an ion-doped material selected from a group consisting of diamond, silicon nitride, silicon carbide, aluminum oxide, tungsten carbide, boron carbide, titanium diboride, titanium carbide, zirconium carbide, tungsten carbide, and combinations thereof.

5. The method of claim 1 wherein:
   providing the plunger includes providing the plunger having the ion-doped material with the electropositive outer surface as a non-planar electropositive outer surface; and
   operably positioning the plunger within the seal includes operably positioning the plunger within the seal such that the non-planar electropositive outer surface of the ion-doped material slidably contacts the electropositive inner surface of the polymeric material.

6. The method of claim 1 wherein providing the seal includes providing the seal having the polymeric material as a polymeric material that includes carbon-hydrogen covalent bonds at the electropositive inner surface.

7. The method of claim 1 wherein providing the seal includes providing the seal having the polymeric material as an aliphatic polymeric material.

8. The method of claim 1 wherein providing the seal includes providing the seal having the polymeric material as ultrahigh molecular weight polyethylene.

9. The method of claim 1, further comprising operably associating the pump with a waterjet machine to provide pressurized liquid to a cutting head of the waterjet machine.

10. The method of claim 1, further comprising bombarding the plunger with ions within a vacuum chamber to form the ion-doped material.

11. The method of claim 10 wherein bombarding the plunger with ions includes bombarding the plunger with hydrogen ions.

12. The method of claim 10 wherein bombarding the plunger with ions includes bombarding the plunger with ions to form a distribution of ions within the ion-doped material, the distribution having a peak ion concentration of at least 0.05 atomic percent.

13. The method of claim 10 wherein bombarding the plunger with ions includes moving ions toward the plunger from an ion source while rotating the plunger relative to the ion source.

14. The method of claim 10 wherein bombarding the plunger with ions includes bombarding the plunger with ions to form a distribution of ions through a wear depth of the plunger.

15. The method of claim 14 wherein bombarding the plunger with ions includes bombarding the plunger with ions to form a multimodal distribution of ions within the plunger.

\* \* \* \* \*